US011545909B2

United States Patent
Lin

(10) Patent No.: US 11,545,909 B2
(45) Date of Patent: *Jan. 3, 2023

(54) FLYBACK POWER CONVERTER AND ACTIVE CLAMP SNUBBER THEREOF

(71) Applicant: Richtek Technology Corporation, Zhubei (TW)

(72) Inventor: Tzu-Chen Lin, Changhua (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/359,336

(22) Filed: Jun. 25, 2021

(65) Prior Publication Data

US 2022/0052612 A1 Feb. 17, 2022

(30) Foreign Application Priority Data

Aug. 11, 2020 (TW) ................................. 109127146

(51) Int. Cl.
| | | |
|---|---|---|
| H02M 3/335 | (2006.01) | |
| H02M 1/34 | (2007.01) | |
| H02M 1/00 | (2006.01) | |

(52) U.S. Cl.
CPC ..... *H02M 3/33592* (2013.01); *H02M 1/0058* (2021.05); *H02M 1/342* (2021.05)

(58) Field of Classification Search
CPC .............................................. H02M 3/335–42
See application file for complete search history.

(56) References Cited

U.S. PATENT DOCUMENTS

| | | | |
|---|---|---|---|
| 5,570,278 A | 10/1996 | Cross | |
| 9,954,456 B2 | 4/2018 | Xue et al. | |
| 2020/0395863 A1* | 12/2020 | Song | H02M 3/33507 |
| 2021/0091675 A1* | 3/2021 | Rajesh | H02M 3/33507 |

FOREIGN PATENT DOCUMENTS

CN 101572490 B 5/2012

\* cited by examiner

*Primary Examiner* — Peter M Novak
(74) *Attorney, Agent, or Firm* — Tung & Associates

(57) ABSTRACT

A flyback power converter includes: a power transformer, a primary side control circuit, a secondary side control circuit, and an active clamp snubber including a snubber switch and a control signal generation circuit. The control signal generation circuit controls the snubber switch to be conductive during a soft switching period in an OFF period of a primary side switch within a switching period of the switching signal, whereby the primary side switch achieves soft switching. A starting time point of the soft switching period is determined by a current threshold, so that a secondary side current is not lower than the current threshold at the starting time point, whereby the secondary side control circuit keeps the SR switch conductive at the starting time point. The secondary side control circuit turns OFF the SR switch when the secondary side current is lower than the current threshold.

18 Claims, 6 Drawing Sheets

FLYBACK POWER CONVERTER AND ACTIVE CLAMP SNUBBER THEREOF

CROSS REFERENCE

The present invention claims priority to TW 109127146 filed on Aug. 11, 2020.

BACKGROUND OF THE INVENTION

Field of Invention

The present invention relates to a flyback power converter; particularly, it relates to such flyback power converter capable of achieving soft switching of a primary side switch therein. The present invention also relates to an active clamp snubber of such flyback power converter.

Description of Related Art

Please refer to FIGS. 1A and 1B, which show schematic diagrams of a conventional flyback power converter having active clamping function (i.e., flyback power converter 1) and its operation waveforms. The flyback power converter 1 is configured to operably convert an input voltage VI to an output voltage VO. The flyback power converter 1 comprises: a transformer 10, a primary side switch S1, a snubber switch S2 and a snubber capacitor Cr. As shown in FIG. 1A, the primary side switch S1 operates according to a primary side switch control signal S1C, so as to control a primary winding W1 of the transformer 10 to convert the input power to the output power. The input power includes an input voltage VI and an input current IIN, whereas, the output power includes an output voltage VO and an output current IOUT. A secondary winding W2 of the transformer 10 generates the output voltage VO and the output current IOUT at an output node OUT, and the output power is supplied to a load circuit 40. When the primary side switch S1 is turned ON, electrical energy is stored in the primary winding W1; when the primary side switch S1 is turned OFF, the electrical energy stored in the primary winding W1 is transferred from the primary winding W1 to the secondary winding W2, so as to generate the output voltage VO at the output node OUT.

The snubber switch S2 and the snubber capacitor Cr together form an active clamp bypass circuit. Please refer to FIG. 1A along with FIG. 1B. FIG. 1B illustrates waveforms of the primary side switch control signal S1C and a buffer control signal S2C. As shown in FIG. 1B, when the primary side switch S1 is nonconductive (i.e., when the primary side switch control signal S1C is at low level), the active clamp bypass circuit is conductive (i.e., the buffer control signal S2C is at high level), such that electrical energy stored in a leakage inductor Lr of the primary winding W1 during a period wherein the primary side switch S1 is conductive is released and delivered to the snubber capacitor Cr via the active clamp bypass circuit; thus, a pulse voltage which is generated when the primary side switch S1 switches will not be too high to damage the circuit devices. In addition, before the primary side switch S1 is turned ON, the energy stored in the snubber capacitor Cr can discharge a parasitic capacitor Coss of the primary side switch S1, so that the primary side switch S1 can achieve soft switching when the primary side switch S1 is turned ON. In this prior art, the primary side switch S1 and the snubber switch S2 switch in opposite phases, as shown in FIG. 1B.

The reference mark Lm in the figure denotes an excited magnetic inductor which is an ideal inductance of the primary winding W1, that is, the excited magnetic inductor Lm expresses an inductance of the primary winding W1 wherein the leakage inductor Lr is excluded. An excited magnetic current Im is a current flowing through the excited magnetic inductor Lm. Besides, a primary side current Ip is a current flowing through the primary winding W1 (which includes the excited magnetic inductor Lm and the leakage inductor Lr). A turn ratio of the primary winding W1 to the secondary winding W2 is n:1. A voltage VDS across the primary side switch S1 is a voltage difference between a drain and a source of the primary side switch S1.

The prior art shown in FIGS. 1A and 1B has the following drawback that: because a dead time Td between an ON period of the primary side switch S1 and an ON period of the snubber switch S2 is generally set as a constant period, there is a likelihood that the turned-ON time point of the primary side switch S1 may not be exactly consistent with the zero voltage switching time point (i.e., a time point when the discharging of the parasitic capacitor Coss is completed). That is, there is a likelihood that the turned-ON time point of the primary side switch S1 may be too early or too late as compared to the zero voltage switching time, which can cause an undesirable circular resonance between the excited magnetic inductor Lm and the snubber capacitor Cr, resulting in power loss.

In addition to the prior art shown in FIGS. 1A and 1B, the following prior arts are relevant to the present invention: U.S. Pat. No. 5,570,278, CN Patent No. 101572490B and U.S. Pat. No. 9,954,456.

As compared to the prior art in FIGS. 1A and 1B, the present invention is advantageous in that: the present invention can adjust a starting time point and an ending time point of the ON period of the snubber switch S2 within the soft switching period, so as to ensure the primary side switch S1 to achieve soft switching during the soft switching period while still fulfilling the snubber efficacy; as a result, unwanted power loss can be reduced, thereby improving the power conversion efficiency.

Besides, as compared to the prior art in FIGS. 1A and 1B, the present invention is advantageous further in that: the present invention can adjust a starting time point and an ending time point of the soft switching period according to a current threshold related to turning OFF a secondary side synchronous rectifier (SR) switch, so as to reduce power loss caused by the output current IO during a period wherein the primary side switch S1 is nonconductive.

In view of the above, to overcome the drawback in the prior art, the present invention proposes a flyback power converter and an active clamp snubber of a flyback power converter, which can reduce power loss caused by the output current when a snubber capacitor is employed, thereby improving power conversion efficiency.

SUMMARY OF THE INVENTION

From one perspective, the present invention provides a flyback power converter, which is configured to operably convert an input voltage to an output voltage; the flyback power converter comprising: a power transformer, which is coupled between the input voltage and the output voltage; a primary side control circuit, which is configured to operably generate a switching signal for controlling a primary side switch, so as to operate a primary winding of the power transformer, wherein the primary winding is coupled to the input voltage; a secondary side control circuit, which is configured to operably control a synchronous rectifier (SR) switch connected in series to a secondary winding according to a secondary side current flowing through the secondary winding of the power transformer, wherein the secondary side control circuit is configured to operably turn OFF the SR switch when the secondary side current is lower than a current threshold; and an active clamp snubber including: a snubber switch; and a control signal generation circuit, wherein the control signal generation circuit is configured to operably control the snubber switch to be conductive during a soft switching period in an OFF period of the primary side switch within a switching period of the switching signal, such that the primary side switch achieves soft switching; wherein the snubber switch is connected in series with a snubber capacitor and the series circuit formed by the snubber switch and the snubber capacitor is connected in parallel to the primary winding; wherein the power transformer is electro-magnetically energized when the primary side switch is conductive, and wherein when the primary side switch is nonconductive, the power transformer delivers energy obtained via the electro-magnetical energization to the output voltage; wherein a starting time point of the soft switching period is determined according to the current threshold, so that the secondary side current is not lower than the current threshold at the starting time point, whereby the secondary side control circuit keeps the SR switch conductive at the starting time point.

From another perspective, the present invention provides an active clamp snubber for use in a flyback power converter, wherein the flyback power converter is configured to operably generate a switching signal for controlling a primary side switch, so as to operate a primary winding in the flyback power converter, thereby converting an input voltage to an output voltage; the active clamp snubber comprising: a snubber switch, which is connected in series to a snubber capacitor, wherein a series circuit formed by the snubber switch and the snubber capacitor is connected in parallel to the primary winding; and a control signal generation circuit, which is configured to operably control the snubber switch to be conductive during a soft switching period in an OFF period of the primary side switch within a switching period of the switching signal, such that the primary side switch achieves soft switching; wherein a secondary side control circuit of the flyback power converter is configured to operably control a synchronous rectifier (SR) switch connected in series to a secondary winding of the power transformer according to a secondary side current flowing through the secondary winding of the power transformer, wherein the secondary side control circuit is configured to operably turn OFF the SR switch when the secondary side current is lower than a current threshold; wherein a starting time point of the soft switching period is determined according to the current threshold, so that the secondary side current is not lower than the current threshold at the starting time point, whereby the secondary side control circuit keeps the SR switch conductive at the starting time point.

In one embodiment, the flyback power converter operates in a boundary conduction mode (BCM) or a discontinuous conduction mode (DCM).

In one embodiment, the snubber capacitor is configured to be operably charged via a leakage inductor current of the primary winding during a snubber period in the OFF period of the primary side switch within the switching period of the switching signal, the snubber period being different from the soft switching period, such that electrical energy stored in a leakage inductor of the primary winding during an ON period of the primary side switch is delivered to the snubber capacitor.

In one embodiment, the control signal generation circuit is configured to adaptively adjust an ending time point of the soft switching period according to a voltage across the primary side switch.

In one embodiment, the control signal generation circuit includes: a secondary side current emulation circuit, which is configured to operably generate a secondary side current emulation signal according to the voltage across the primary winding and an excited magnetic inductance of the primary winding, so as to emulate the secondary side current; and a comparison circuit coupled to the secondary side current emulation circuit, wherein the comparison circuit is configured to operably generate a soft switching period determination signal according to the secondary side current emulation signal, a peak of a primary side current and the current threshold, so as to determine the starting time point and an ending time point of the soft switching period; wherein the primary side current is a current which flows through the primary winding during an ON period of the primary side switch within the switching period.

In one embodiment, the comparison circuit is configured to operably determine the starting time point according to the secondary side current emulation signal, the peak of the primary side current and the current threshold, and the comparison circuit is configured to operably determine the ending time point according to the secondary side current emulation signal and the peak of the primary side current.

In one embodiment, the secondary side current emulation circuit includes: a voltage-to-current conversion circuit, which is configured to operably generate a charging current, wherein the voltage-to-current conversion circuit includes: a conversion resistor; an amplifier circuit coupled to the conversion resistor, wherein the amplifier circuit is configured to operably generate a conversion current flowing through the conversion resistor according to the voltage across the primary winding and a resistance of the conversion resistor, wherein the conversion current is positively proportional to the voltage across the primary winding; and a current mirror circuit coupled to the amplifier circuit, wherein the current mirror circuit is configured to operably mirror the conversion current to generate the charging current; and an emulation capacitor coupled to the current mirror circuit, wherein the emulation capacitor is configured to be operably charged by the charging current, so as to generate the secondary side current emulation signal.

In one embodiment, the control signal generation circuit further includes: a sample and hold circuit coupled to the comparison circuit, wherein the sample and hold circuit is configured to operably sample and hold the peak of the primary side current, so as to generate an ending threshold which is inputted to the comparison circuit; and a bias voltage circuit coupled to the sample and hold circuit, wherein the bias voltage circuit is configured to operably add the ending threshold on a bias voltage value related to the current threshold, so as to generate a starting threshold; wherein the comparison circuit compares the secondary side current emulation signal with the starting threshold, so as to determine the starting time point; wherein the comparison circuit compares the secondary side current emulation signal with the ending threshold, so as to determine the ending time point.

In one embodiment, the secondary side current emulation circuit is configured to adaptively adjust the resistance of the conversion resistor and/or a capacitance of the emulation capacitor further according to the voltage across the primary winding during a setting period which follows right after the soft switching period, thereby causing the primary side switch to achieve zero voltage switching; wherein the setting period is correlated with a period for the voltage across the primary side switch to drop from a charging voltage at the ending time point to zero.

In one embodiment, the secondary side current is not lower than the current threshold during the soft switching period, and wherein the secondary side control circuit keeps the SR switch conductive during the soft switching period.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
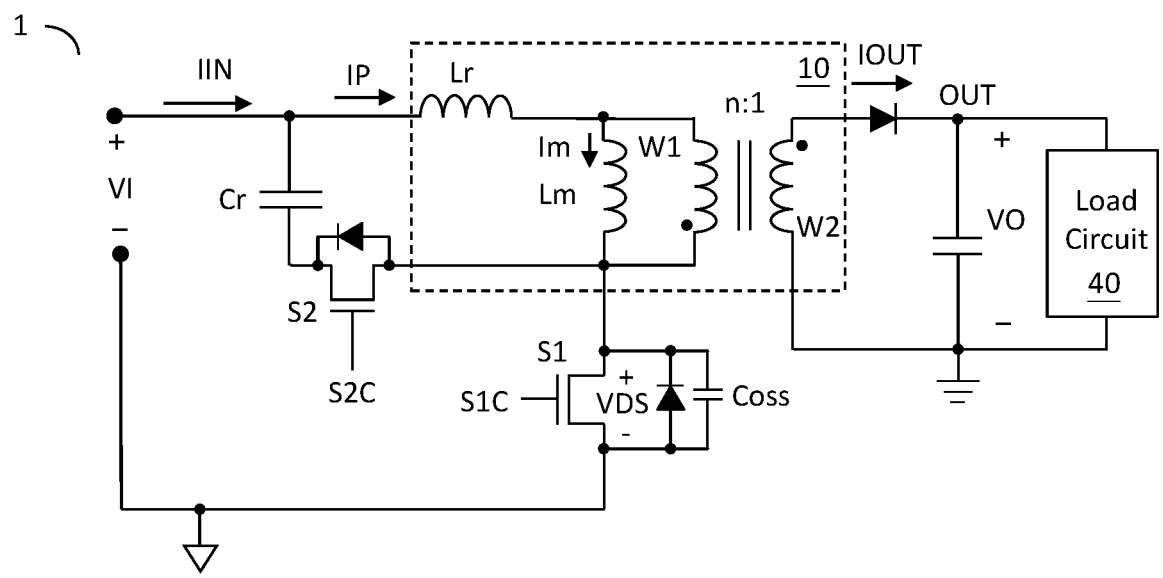
FIGS. 1A and 1B show schematic diagrams of a conventional flyback power converter having active clamping function and its operation waveforms.
Figure 1B:
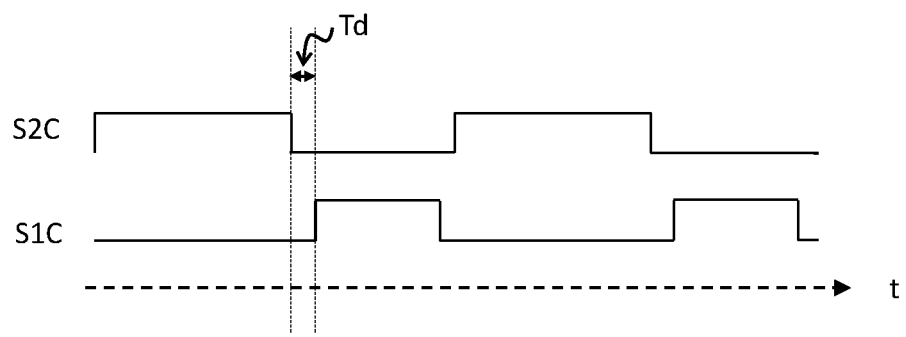
Figure 2A:
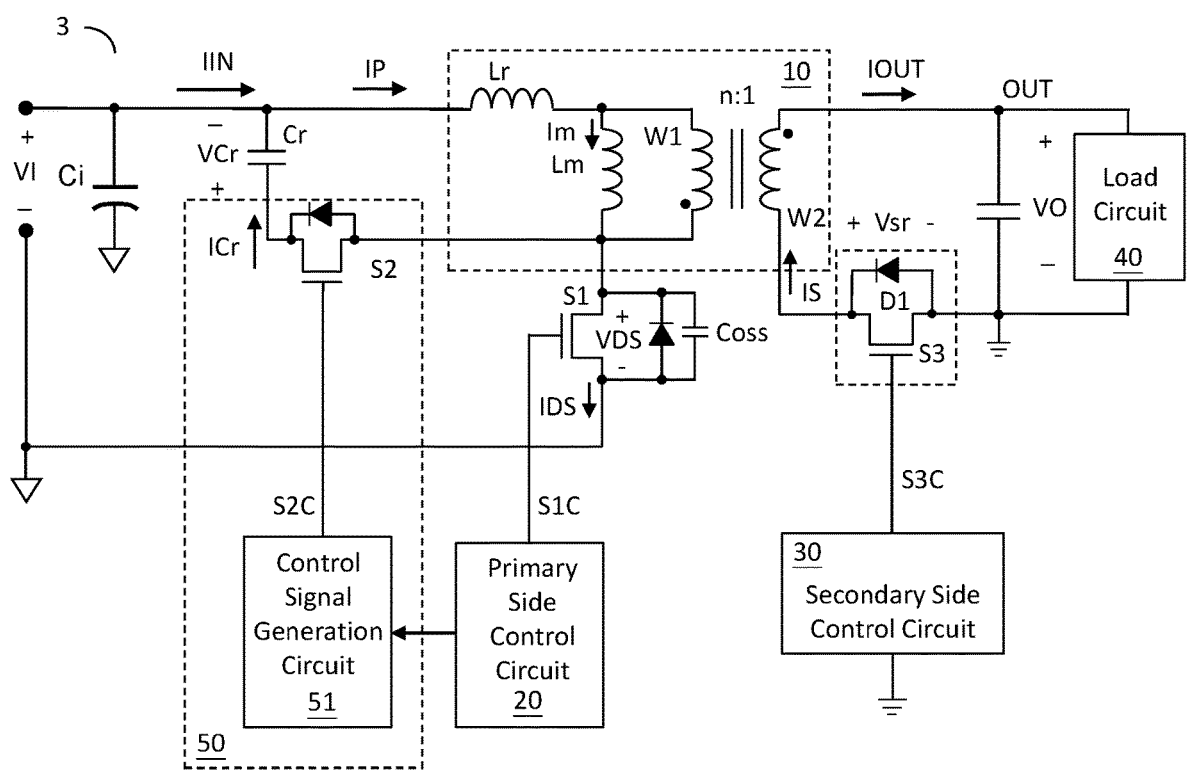
FIG. 2A shows a schematic diagram of a flyback power converter according to an embodiment of the present invention.

Please refer to FIG. 2A, which shows a schematic diagram of a flyback power converter (i.e., flyback power converter 3) according to an embodiment of the present invention. The flyback power converter 3 of the present invention comprises: a power transformer 10, a primary side switch S1, a snubber capacitor Cr, a primary side control circuit 20, a secondary side control circuit 30, a synchronous rectifier (SR) switch S3 and an active clamp snubber 50. As shown in FIG. 2A, the power transformer 10 includes a primary winding W1 and a secondary winding W2. The primary winding W1 is coupled to an input power. The input power includes an input voltage VI and an input current IIN. For the sake of explanation, FIG. 2A shows that the primary winding W1 has a leakage inductor Lr and an excited magnetic inductor Lm. The secondary winding W2 is coupled to an output node OUT. The primary side switch S1 is coupled to the primary winding W1 and is configured to operably switch the primary winding W1, so as to convert the input power, thereby causing the secondary winding W2 to generate an output power at the output node OUT. The output power at the output node OUT is supplied to a load circuit 40. The output power includes an output voltage VO and an output current IOUT.

The primary winding W1 has a leakage inductor Lr. As one of average skill in the art readily understands, "leakage inductor" is generated in a transformer which is in an incomplete coupling state. In a non-ideal transformer, the coupling coefficient between the primary winding and the secondary winding is smaller than one; under such circumstance, a part of a winding of such non-ideal transformer does not operate for power transformation. Accordingly, this part of winding is referred to as the "leakage inductor". On the other hand, in an ideal transformer, the primary winding and the secondary winding are in a complete coupling state (i.e., the coupling coefficient between the primary winding and the secondary winding is equal to one, which is shown by the excited magnetic inductor Lm in FIG. 2A). That is, in an ideal transformer, the leakage inductance of the leakage inductor is equal to zero. However, such ideal transformer does not exist; so, in an actual circuit, a leakage inductance exists and this is well known to those skilled in the art.

Figure 2B:
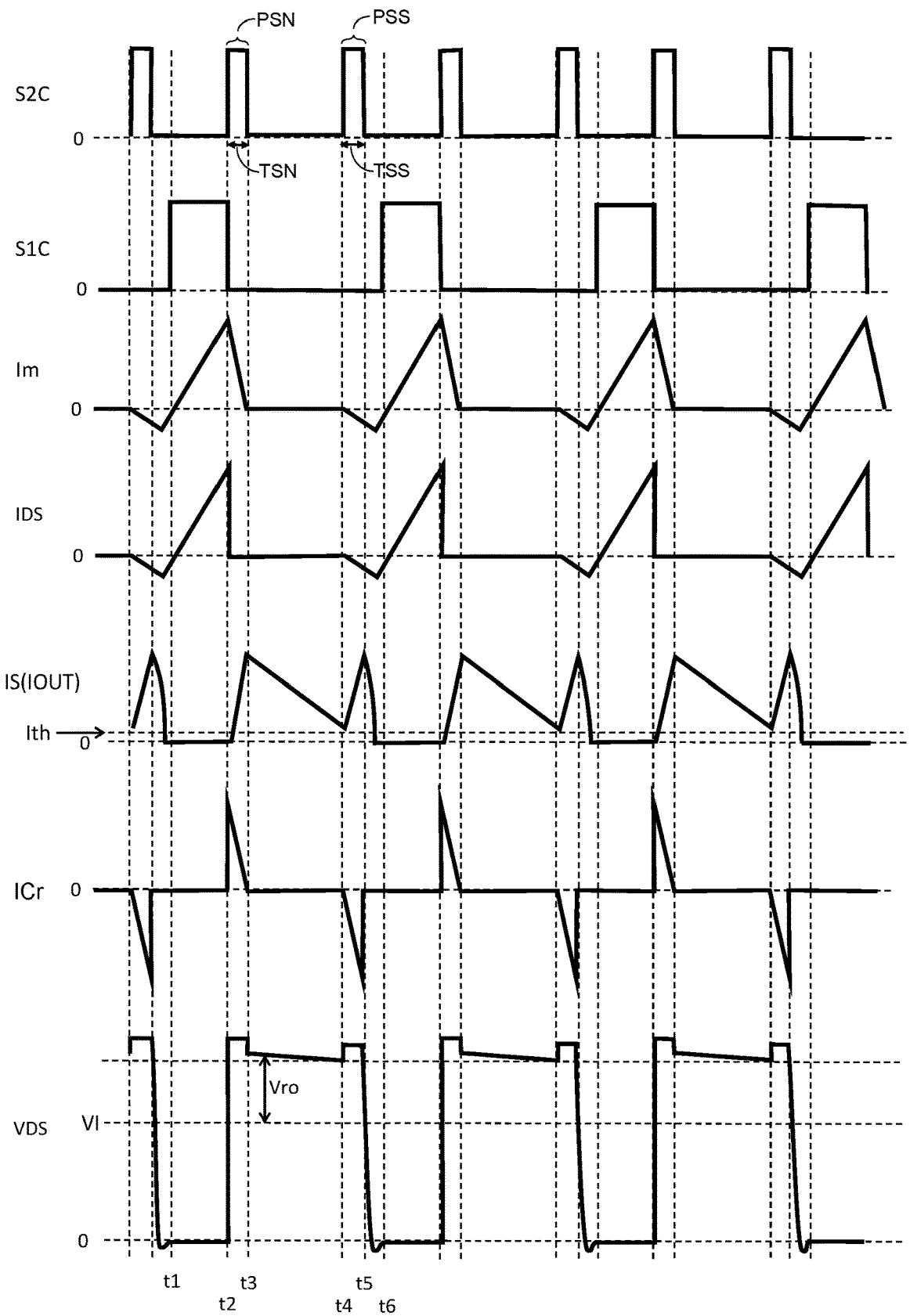
FIGS. 2B and 2C illustrate waveform diagrams depicting the relevant signals corresponding to the flyback power converter of FIG. 2A.

Please refer to FIG. 2A in conjugation with FIG. 2B. FIG. 2B illustrates waveforms of the relevant signals corresponding to the flyback power converter of FIG. 2A. As shown in FIG. 2A, the power transformer 10 is coupled between the input voltage VI and the output voltage VO. The primary side control circuit 20 is configured to operably generate a switching signal S1C for controlling a primary side switch S1, so as to operate a primary winding W1 of the power transformer 10, wherein the primary winding W1 is coupled to the input voltage VI. The secondary side control circuit 30 is configured to operably generate an SR control signal S3C according to a secondary side current IS (in this embodiment, the secondary side current IS is equal to the output current IOUT) flowing through the secondary winding W2 of the power transformer 10, so as to control an SR switch S3 connected in series to the secondary winding W2. Besides, the secondary side control circuit 30 is configured to operably turn OFF the SR switch S3 when the secondary side current IS (i.e., the output current IOUT) is lower than a current threshold Ith. The secondary side control circuit 30 is configured to operably generate the SR control signal S3C according to for example a voltage Vsr across the SR switch S3 (which relates to the secondary side current IS).

The active clamp snubber 50 includes a snubber switch S2 and a control signal generation circuit 51. The control signal generation circuit 51 is configured to operably generate a soft switching pulse PSS in the snubber control signal S2C for a soft switching period TSS (e.g., t4-t5 in FIG. 2B). The soft switching pulse PSS turns ON the snubber switch S2, thereby causing the primary side switch S1 to achieve soft switching. The soft switching pulse PSS is generated in an OFF period (e.g., t2-t6 in FIG. 2B) of the primary side switch within a switching period (e.g., t1-t6 in FIG. 2B) of the switching signal S1C.

The snubber switch S2 is connected in series with a snubber capacitor Cr. The series circuit formed by the snubber switch S2 and the snubber capacitor Cr is connected in parallel to the primary winding W1. When the primary side switch S1 is conductive, the power transformer 10 is electro-magnetically energized, and when the primary side switch S1 is turned OFF, the power transformer 10 delivers the energy to generate the output voltage VO. The starting time point (e.g., t4) of the soft switching period TSS (e.g., t4-t5 in FIG. 2B) is determined according to the current threshold Ith; when the secondary side current IS (in this embodiment, the secondary side current IS is equal to the output current IOUT) drops to or is near to the current threshold Ith at the time point t4, the soft switching period TSS starts. The secondary side current IS is controlled not lower than the current threshold Ith at the starting time point (t4), and the secondary side control circuit 30 keeps the SR switch S3 conductive at the starting time point (t4).

It is noteworthy that, as one of average skill in the art will readily understand, the term. "soft switching (SS)" refers to: before a transistor (e.g., corresponding to the primary side switch S1) is about to be turned ON, the residue voltage in the parasitic capacitor (e.g., corresponding to the capacitor Coss) of this transistor is discharged to a low level by a discharging current (e.g., corresponding to a current flowing from the capacitor Coss when the snubber switch S2 is conductive during the soft switching period) through a discharging path having low or no power loss (e.g., corresponding to the primary side winding W1) and the charges are stored back to a device having low or no power loss (e.g., the input capacitor Ci). As a consequence, when it is time for the transistor to be turned ON, the drain-source voltage (e.g., corresponding to a voltage VDS across the primary side switch S1) of the transistor has been reduced to a very low voltage (substantially zero). Because the charges stored in the parasitic capacitor (e.g., corresponding to the parasitic capacitor Coss of the primary side switch S1) of this transistor is not discharged through the conduction resistance of the transistor, the power conversion efficiency is enhanced. Take FIG. 2A as an example, before the primary side switch S1 is about to be turned ON, the parasitic capacitor Coss of the primary side switch S1 can be discharged via energy stored in an auxiliary capacitor Cr. As a result, the voltage VDS across the primary side switch S1 will be reduced to substantially zero at the turned-ON time point of the primary side switch S1, thereby achieving optimal situation in soft switching, which is Zero Voltage Switching (ZVS).

In addition, the snubber switch S2 is turned ON according to a snubber pulse PSN of the snubber control signal S2C generated by the control signal generation circuit 51 for a snubber period TSN (e.g., t2-t3 in FIG. 2B) which is different from the soft switching period TSS (e.g., t4-t5 in FIG. 2B), in the OFF period (e.g., t2-t6 in FIG. 2B) of the primary side switch S1 within the switching period (e.g., t1-t6 in FIG. 2B and FIG. 2C) of the switching signal S1C, so as to charge the snubber capacitor Cr via a leakage inductor current Icr of the primary winding W1. As a result, electrical energy stored in the leakage inductor Lr of the primary winding W1 during a period wherein the primary side switch S1 is conductive (e.g., t1-t2 in FIG. 2B and FIG. 2C) is delivered to the snubber capacitor Cr; thus, a pulse voltage which is generated when the primary side switch S1 switches will not be too high to damage the circuit devices. Besides, a voltage Vcr across the snubber capacitor Cr is increased, which will be employed to discharge the parasitic capacitor Coss during the following soft switching period TSS.

In one embodiment, the flyback power converter 3 operates in a boundary conduction mode (BCM) or a discontinuous conduction mode (DCM). BCM and DCM are well known to those skilled in the art, so the details thereof are not redundantly explained here.

Figure 2C:
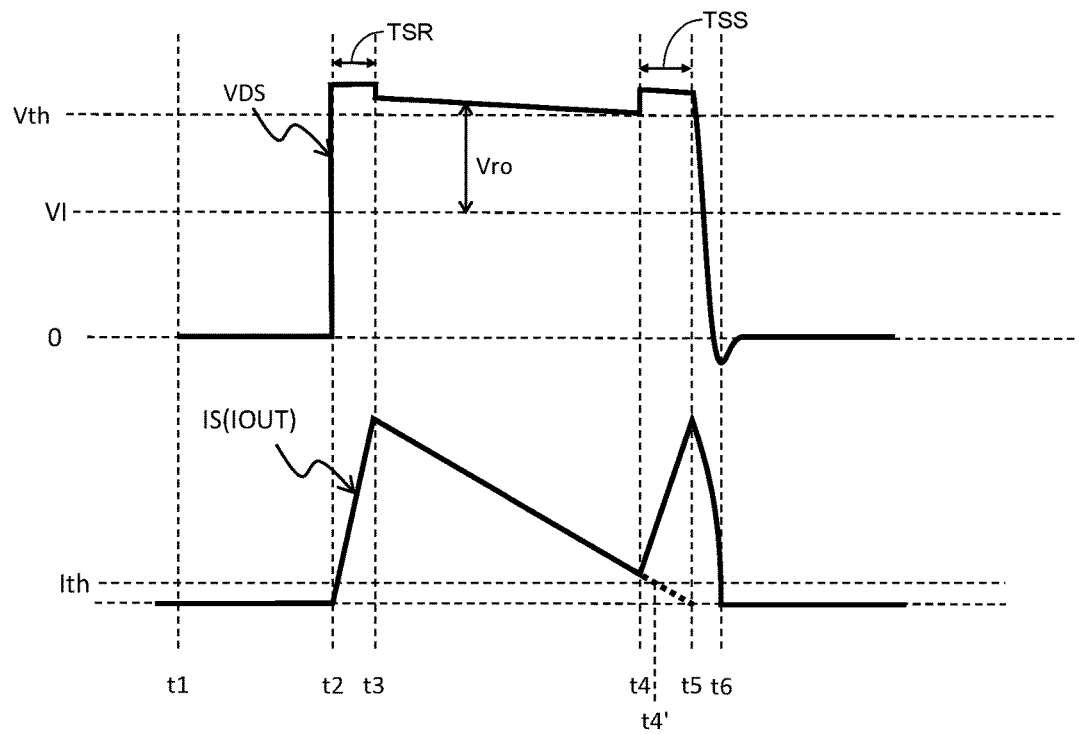

Take the flyback power converter 3 shown in FIG. 2A as an example. Please refer to FIG. 2A along with FIG. 2C. FIG. 2C illustrates waveforms of a voltage VDS across the primary side switch S1 and a secondary side current IS during a switching period (e.g., t1-t6 in FIG. 2C) of the switching signal SIC. In one embodiment, the control signal generation circuit 51 is configured to adaptively adjust an ending time point (e.g., t5 in FIG. 2C) of the soft switching period TSS (e.g., t4-t5 in FIG. 2C) according to the voltage VDS across the primary side switch S1.

If the secondary side current IS flowing through the secondary winding W2 is lower than the current threshold Ith and the secondary side control circuit 30 turns OFF the SR switch S3 which is connected in series to a secondary winding W2, the secondary side current IS will be unable to flow through a transistor in the SR switch S3 but will flow through a parasitic diode D1 in the SR switch S3. As a result, before a starting time point (e.g., t4 in FIG. 2C) of an ON period of the primary side switch S1, such as in the period from the time point t4' to the time point t6 in FIG. 2C as shown by a thick dashed line, the secondary side current IS will flow through the parasitic diode D1. As compared to a case wherein the secondary side current IS flows through the transistor in the SR switch S3, that the secondary side current IS flows through the parasitic diode D1 in the SR switch S3 will cause a relatively greater power loss, lowering the power conversion efficiency of the flyback power converter 3.

In contrast, in the present invention, while controlling an ON period of the snubber switch S2 (i.e., through controlling the time point t4 and the time point t5 in FIG. 2B) to achieve soft switching of the primary side switch S1 during a soft switching period TSS (e.g., t4-t5 in FIG. 2B), at the same time, the secondary side current IS is controlled not lower than a current threshold Ith at the time point t4 via inductor coupling effect of the power transformer 10. As a result, the secondary side control circuit 30 can keep the SR switch S3 conductive at the starting time point t4 of the soft switching period TSS, so that the secondary side current IS can flow through the transistor switch in the SR switch S3. Consequently, power loss can be reduced, to enhance the power conversion efficiency of the flyback power converter 3. Moreover, this embodiment can adaptively adjust an ending time point t5 of the soft switching period TSS according to a voltage VDS across the primary side switch S1, so as to ensure that before the primary side switch S1 is turned ON, the voltage VDS across the primary side switch S1 is substantially equal to zero, thereby achieving zero voltage switching, which is an optimal condition of soft switching. Because the primary winding W1, the primary side switch S1, the snubber switch S2 and the snubber capacitor Cr are devices having predetermined parameters, when the snubber switch S2 is conductive during the soft switching period TSS, the time point when the voltage VDS across the primary side switch S1 is reduced to zero can be predicted according to the voltage VDS at the time point t4. Therefore, by adaptively adjusting the ending time point t5 of the soft switching period TSS by the control signal generation circuit 51 according to the voltage VDS across the primary side switch S1 at the time point t4, this embodiment can achieve zero voltage switching and thus enhancing the power conversion efficiency.

According to the present invention, taking the flyback power converter 3 shown in FIG. 2A as an example, the secondary side control circuit 30 is configured to operably control an SR switch S3 connected in series to the secondary winding W2 according to the secondary side current IS (in this embodiment, the secondary side current IS is equal to the output current IOUT) flowing through the secondary winding W2 of the power transformer 10, and, the secondary side control circuit 30 is configured to operably turn OFF the SR switch S3 when the secondary side current IS (i.e., the output current IOUT) is lower than the current threshold Ith.

In the example shown in FIG. 2B, the flyback power converter 3 operates in a boundary conduction mode (BCM). Certainly, it is also practicable and within the scope of the present invention that the flyback power converter 3 can operate in for example a discontinuous conduction mode (DCM). The present invention can be applied to any operation mode, as long as in this operation mode the secondary side current IS will be reduced to zero during an OFF period of the primary side switch S1 within a switching period of the switching signal SIC.

In one preferred embodiment, the secondary side current IS is kept not lower than the current threshold Ith during the whole soft switching period TSS, and the secondary side control circuit 30 keeps the SR switch S3 conductive during the whole soft switching period TSS. According to the present invention, as long as it is ensured that the secondary side current IS is not lower than the current threshold Ith at the time point t4, the primary side switch S1 can achieve soft switching, and the secondary side current IS can flow through the transistor switch in the SR switch S3 to reduce power loss and enhance the power conversion efficiency of the flyback power converter 3. However in one embodiment, preferably, the secondary side current IS is kept not lower than the current threshold Ith during the whole soft switching period TSS, and the secondary side control circuit 30 keeps the SR switch S3 conductive during the whole soft switching period TSS, whereby the primary side switch S1 can achieve optimum soft switching and higher power conversion efficiency.

Note that, although it is preferred for the parasitic capacitor Coss to be discharged to 0V, so as to achieve zero voltage switching, however due to non-idealities caused by for example imperfection of components or imperfect matching among components, the voltage of the parasitic capacitor Coss may not be discharged exactly to 0V, but just close to 0V. In other words, according to the present invention, a certain level of error between 0V and the voltage VDS across the parasitic capacitor Coss after discharge is acceptable, and therefore the term "substantially" is used to mean that an insignificant error within a tolerable range is acceptable. It is noted here that whenever the term "substantially" is used in this specification, it means that an insignificant error within a tolerable range is acceptable.

FIG. 2B illustrates waveforms of a snubber control signal S2C, a switching signal S1C, a current Im flowing through an excited magnetic inductor Lm, a current IDS flowing through a primary side switch S1, a secondary side current IS, a current IC flowing through a snubber capacitor Cr and a voltage VDS across the primary side switch S1. The voltage Vro across the primary winding W1 is equal to a product of the output voltage VO multiplied by the turn ratio n; the voltage Vro is positively proportional to the output voltage VO.

Figure 3:
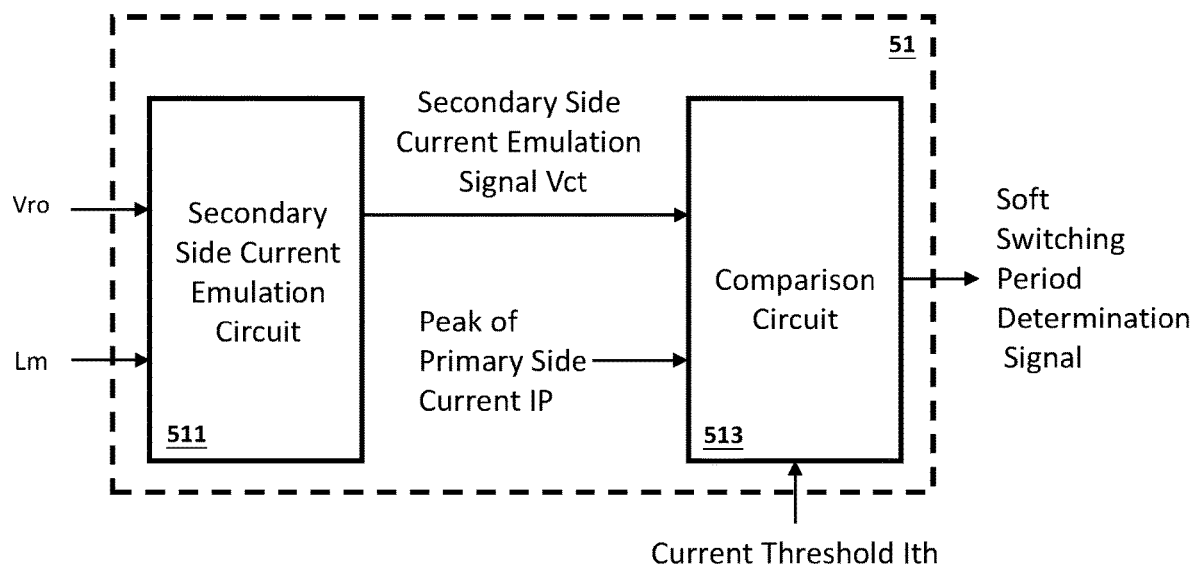
FIG. 3 shows an embodiment of a control signal generation circuit.

Please refer to FIG. 3, which shows an embodiment of a control signal generation circuit (i.e., control signal generation circuit 51). As shown in FIG. 3, the control signal generation circuit 51 includes a secondary side current emulation circuit 511 and a comparison circuit 513. The secondary side current emulation circuit 511 is configured to operably generate a secondary side current emulation signal Vct to emulate the secondary side current IS according to the voltage Vro across the primary winding W1 and the inductance of the excited magnetic inductor Lm of the primary winding W1. The comparison circuit 513 is coupled to the secondary side current emulation circuit 511. The comparison circuit 513 is configured to operably generate a soft switching period determination signal to determine a starting time point t4 and an ending time point t5 of the soft switching period TSS according to the secondary current emulation signal Vct, a peak of a primary side current IP and the current threshold Ith. The primary side current IP is a current flowing through the primary winding W1 during an ON period (e.g., t1-t2 in FIG. 2B and FIG. 2C) of the primary side switch S1 within a switching period (e.g., t1-t6 in FIG. 2B and FIG. 2C). The primary side current IP is substantially equal to the current Im flowing through the excited magnetic inductor Lm. Based upon the characteristics of the inductor current, the peak of the primary side current IP is positively proportional to the peak of the secondary side current IS. Hence, the comparison circuit 513 can obtain the peak of the secondary side current IS according to the peak of the primary side current IP.

In one embodiment, the comparison circuit 513 is configured to operably determine the ending time point (e.g., t5 in FIG. 2B and FIG. 2C) according to the secondary side current emulation signal Vct and the peak of the primary side current IP. Besides, the comparison circuit 513 is configured to operably determine the starting time point (e.g., t4 in FIG. 2B and FIG. 2C) according to the secondary side current emulation signal Vct and a starting threshold Vpri. The starting threshold Vpri is a sum of an ending threshold Vpk plus a bias voltage Vbs which is related to the current threshold Ith.

Figure 4:
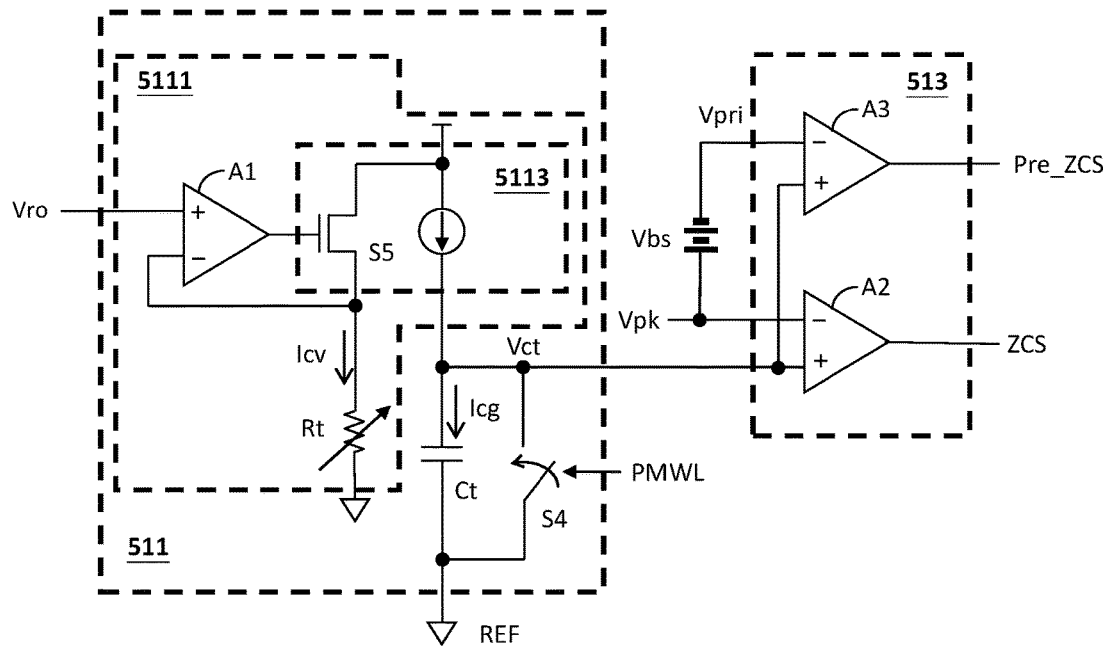
FIG. 4 shows a specific embodiment of a control signal generation circuit.

Please refer to FIG. 4, which shows a specific embodiment of a control signal generation circuit 51. As shown in FIG. 4, the control signal generation circuit 51 includes a secondary side current emulation circuit 511 and a comparison circuit 513. The secondary side current emulation circuit 511 includes: a voltage-to-current conversion circuit 5111, an emulation capacitor Ct and a switch S4. The voltage-to-current conversion circuit 5111 is configured to operably generate a charging current Icg, wherein the voltage-to-current conversion circuit 5111 includes: a conversion resistor Rt, an amplifier circuit A1 and a current mirror circuit 5113. The amplifier circuit A1 is coupled to the conversion resistor Rt and is configured to operably generate a conversion current Icv flowing through the conversion resistor Rt according to the voltage Vro across the primary winding W1 and a resistance of the conversion resistor Rt. The conversion current Icv is positively proportional to the voltage Vro across the primary winding W1. The current mirror circuit 5113 is coupled to the amplifier circuit and is configured to operably mirror the charging current Icg according to the conversion current Icv.

The emulation capacitor Ct is coupled to the current mirror circuit 5113 and is configured to be operably charged by the charging current Icg to generate the secondary side current emulation signal Vct. It is noteworthy that, in one embodiment, the switch S4 can be omitted from the secondary side current emulation circuit 511. The switch S4 is configured to operably receive pulse width modulation signal PWML that is substantially in phase with the switching signal S1C, so as to ensure an input end of the comparison circuit 513 to be shorted to a reference level REF when the primary side switch S1 is conductive. When the primary side switch S1 is conductive, the input end of the comparison circuit 513 is directly electrically connected to the reference level REF, to reset the secondary side current emulation signal Vct. The reference level REF can be for example the ground level.

As shown in FIG. 4, the amplifier circuit A1 and a transistor S5 form a unit gain buffer circuit. The thus formed unit gain buffer circuit is configured to operably generate the conversion current Icv according to the voltage Vro across the primary winding W1. The current mirror circuit 5113 includes for example the transistor S5 and a current source.

The current mirror circuit 5113 is configured to operably mirror the conversion current Icv to generate the charging current Icg. The conversion current Icv is adjusted according to the conversion resistor Rt. Hence, the charging current Icg can be adjusted through adjusting the resistance of the conversion resistor Rt, and the secondary side current emulation signal Vct can be adjusted according to the adjusted charging current Icg. The charging current Icg charges the emulation capacitor Ct to generate the secondary side current emulation signal Vct. Therefore, the secondary side current emulation signal Vct also can be adjusted through adjusting the capacitance of the emulation capacitor Ct.

Please still refer to FIG. 4. The comparison circuit 513 includes an amplifier circuit A2 and an amplifier circuit A3. The amplifier circuit A2 is configured to operably compare the secondary side current emulation signal Vct with an ending threshold Vpk related to the peak of the primary side current IP, so as to generate an ending determination signal ZCS for determining the ending time point (e.g., t5 in FIG. 2B and FIG. 2C). The amplifier circuit A3 is configured to operably compare the secondary side current emulation signal Vct with a starting threshold Vpri, so as to generate a starting determination signal Pre_ZCS for determining the starting time point (e.g., t4 in FIG. 2B and FIG. 2C). The starting threshold Vpri is a sum of the ending threshold Vpk plus a bias voltage value Vbs which is related to the current threshold Ith, whereby the SR switch S3 is kept conductive at the starting time point (e.g., t4 in FIG. 2B and FIG. 2C).

Figure 5:
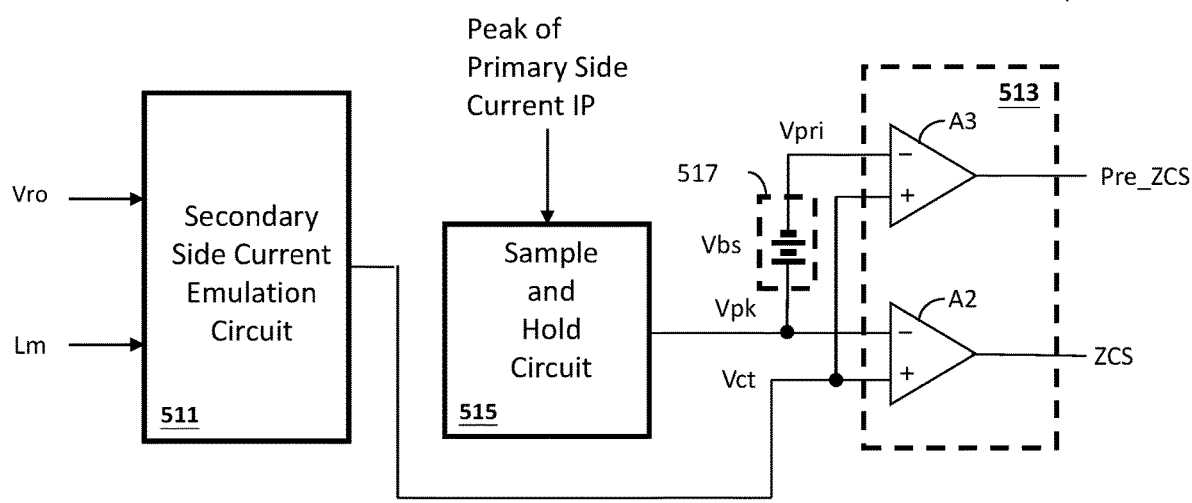
FIG. 5 shows an embodiment of a control signal generation circuit 51.

Please refer to FIG. 5, which shows an embodiment of a control signal generation circuit 51. This embodiment illustrates that: in addition to including a secondary side current emulation circuit 511 and a comparison circuit 513, the control signal generation circuit 51 can further include: a sample and hold circuit 515 and a bias voltage circuit 517. The sample and hold circuit 515 is coupled to the comparison circuit 513 and is configured to operably sample and hold the peak of the primary side current IP, so as to generate the ending threshold Vpk which is inputted to the comparison circuit 513. The bias voltage circuit 517 is coupled to the sample and hold circuit 515 and is configured to operably add the ending threshold Vpk with the bias voltage value Vbs related to the current threshold Ith, so as to generate the starting threshold Vpri.

Figure 6:
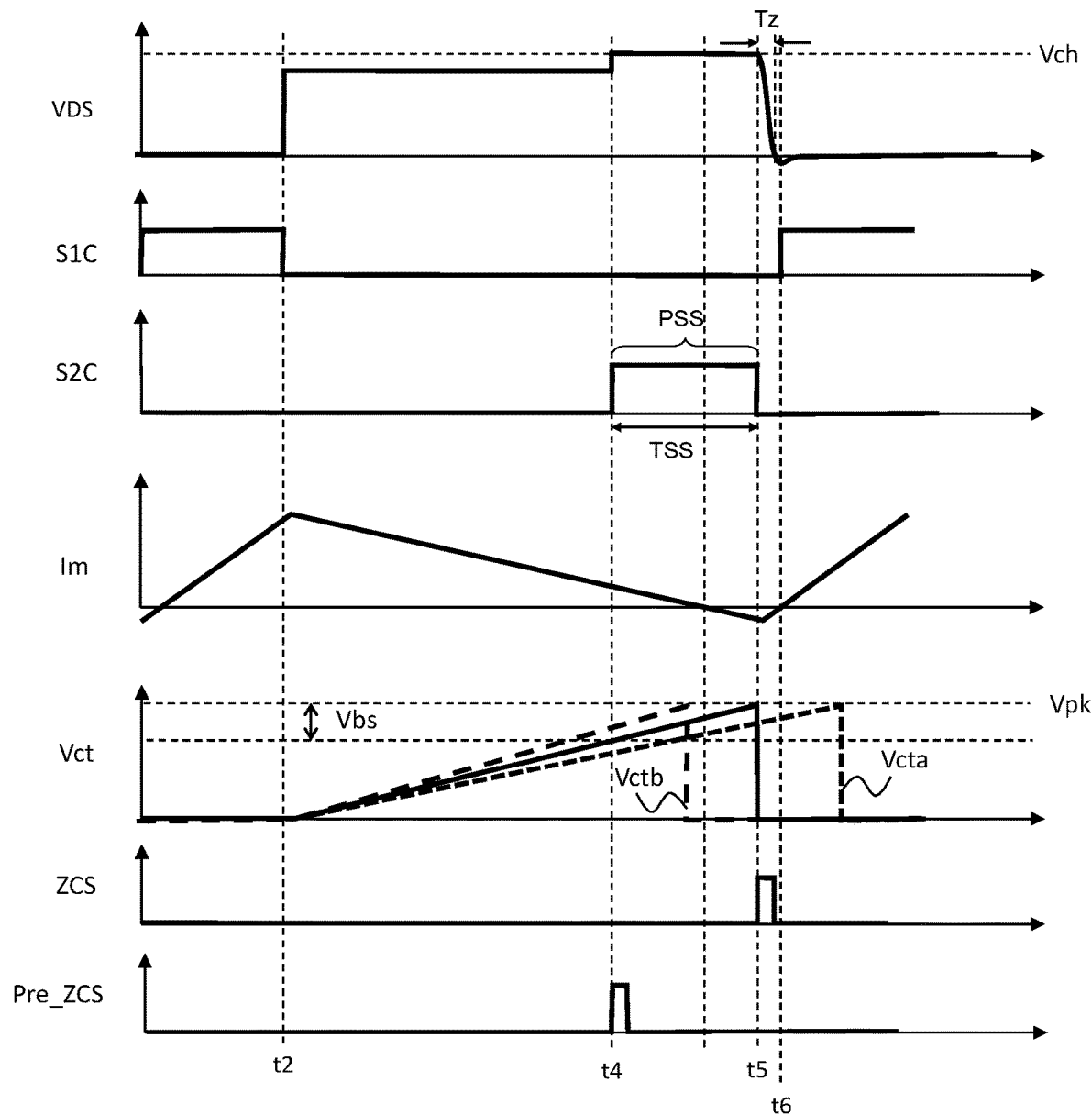
FIG. 6 illustrates waveform diagrams depicting the relevant signals corresponding to the present invention.

Please refer to FIG. 6, which illustrates waveforms of the relevant signals corresponding to the present invention. FIG. 6 illustrates that: according to the present invention, the secondary side current emulation circuit 511 of the control signal generation circuit 51 is configured to adaptively adjust the resistance of the conversion resistor Rt and/or a capacitance of the emulation capacitor Ct further according to the voltage VDS across the primary winding w1 during a setting period Tz which follows right after the soft switching period TSS, thereby achieving zero voltage switching of the primary side switch S1. The setting period Tz is correlated with a period for the voltage VDS across the primary side switch S1 to drop from a charging voltage Vch at the ending time point t5 to zero.

The "charging voltage Vch" results from a sum of the input voltage VI added by a voltage Vcr across the snubber capacitor Cr. During a snubber period TSN which is different from the soft switching period TSS in the OFF period (e.g., t2-t6 in FIG. 2B) of the primary side switch S1, the snubber capacitor Cr has been charged via a leakage inductor current Icr of the primary winding W1. During the soft switching period TSS, the snubber switch S2 is conductive so that the snubber capacitor Cr is electrically connected to the primary side switch S1; the voltage VDS across the primary side switch S1 reaches to the charging voltage Vch as the parasitic capacitor is charged.

In one embodiment, during a period ranging from the time point t5 when the snubber switch S2 is turned OFF to the time point t6 when the primary side switch S1 is turned ON again, the voltage VDS across the primary side switch S1 is discharged from the above-mentioned charging voltage Vch to zero through a discharging path having low or no power loss (e.g., corresponding to the primary side winding W1) and the charges are stored back to a device having low or no power loss (e.g., the input capacitor Ci). As a consequence, when it is time for the primary side switch S1 to be turned ON, the drain-source voltage (e.g., corresponding to a voltage VDS across the primary side switch S1) of the primary side switch S1 has been reduced to a very low voltage. Because the parasitic capacitor (e.g., corresponding to the parasitic capacitor Coss of the primary side switch S1) of this primary side switch S1 is not discharged through the conduction resistance of the primary side switch S1, the power conversion efficiency is enhanced.

Please still refer to FIG. 6. In the waveforms of the secondary side current emulation signal Vct, a secondary side current emulation signal Vcta which is illustrated as a dashed line illustrates a situation wherein the soft switching period TSS is delayed. Under the situation wherein the soft switching period TSS is delayed, when the primary side switch S1 is turned ON, the voltage VDS across the primary side switch S1 has not yet been discharged to zero. As a consequence, zero voltage switching cannot be achieved, thus reducing the power conversion efficiency. On the other hand, in the waveforms of the secondary side current emulation signal Vct, a secondary side current emulation signal Vctb which is illustrated as a dashed line illustrates a situation wherein the soft switching period TSS is earlier. Under the situation wherein the soft switching period TSS is earlier, due to the fact that a circular resonance occurs in the LC circuit, when the primary side switch S1 is turned ON, the voltage VDS across the primary side switch S1 has not yet been discharged to zero, so zero voltage switching cannot be achieved. Besides, under the situation wherein the soft switching period TSS is earlier, the SR switch S3 will be turned OFF too early. As a result, the secondary side current IS will flow through a parasitic diode D1 in the SR switch S3, which will cause a relatively greater power loss, thus reducing the power conversion efficiency of the flyback power converter 3. Because the characteristics of the circuit devices are known, the setting period Tz can be calculated. The setting period Tz is correlated with a period for the voltage VDS across the primary side switch S1 to drop from the charging voltage Vch at the ending time point t5 to zero. The resistance of the conversion resistor Rt and/or the capacitance of the emulation capacitor Ct can be determined accordingly, to achieve zero voltage switching of the primary side switch S1.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A flyback power converter, which is configured to operably convert an input voltage to an output voltage; the flyback power converter comprising:
    a power transformer, which is coupled between the input voltage and the output voltage;
    a primary side control circuit, which is configured to operably generate a switching signal for controlling a primary side switch, so as to operate a primary winding of the power transformer, wherein the primary winding is coupled to the input voltage;
    a secondary side control circuit, which is configured to operably control a synchronous rectifier (SR) switch connected in series to a secondary winding of the power transformer according to a secondary side current flowing through the secondary winding of the power transformer, wherein the secondary side control circuit is configured to operably turn OFF the SR switch when the secondary side current is lower than a current threshold; and
    an active clamp snubber including:
        a snubber switch; and
        a control signal generation circuit, wherein the control signal generation circuit is configured to operably control the snubber switch to be conductive during a soft switching period in an OFF period of the primary side switch within a switching period of the switching signal, such that the primary side switch achieves soft switching;
    wherein the snubber switch is connected in series with a snubber capacitor and the series circuit formed by the snubber switch and the snubber capacitor is connected in parallel to the primary winding;
    wherein the power transformer is electro-magnetically energized when the primary side switch is conductive, and wherein when the primary side switch is nonconductive, the power transformer delivers energy obtained via the electro-magnetical energization to the output voltage;
    wherein a starting time point of the soft switching period is determined according to the current threshold, so that the secondary side current is not lower than the current threshold at the starting time point, whereby the secondary side control circuit keeps the SR switch conductive at the starting time point;
    wherein the snubber capacitor is configured to be operably charged via a leakage inductor current of the primary winding during a snubber period in the OFF period of the primary side switch within the switching period of the switching signal, the snubber period being different from the soft switching period, such that electrical energy stored in a leakage inductor of the primary winding during an ON period of the primary side switch is delivered to the snubber capacitor.

2. The flyback power converter of claim 1, wherein the flyback power converter operates in a boundary conduction mode (BCM) or a discontinuous conduction mode (DCM).

3. The flyback power converter of claim 1, wherein the control signal generation circuit is configured to adaptively adjust an ending time point of the soft switching period according to a voltage across the primary side switch.

4. The flyback power converter of claim 1, wherein the secondary side current is not lower than the current threshold during the soft switching period, and wherein the secondary side control circuit keeps the SR switch conductive during the soft switching period.

5. The flyback power converter of claim 1, wherein the control signal generation circuit includes:
    a secondary side current emulation circuit, which is configured to operably generate a secondary side current emulation signal according to the voltage across the primary winding and an excited magnetic inductance of the primary winding, so as to emulate the secondary side current; and
    a comparison circuit coupled to the secondary side current emulation circuit, wherein the comparison circuit is configured to operably generate a soft switching period determination signal according to the secondary side current emulation signal, a peak of a primary side current and the current threshold, so as to determine the starting time point and an ending time point of the soft switching period;
    wherein the primary side current is a current which flows through the primary winding during an ON period of the primary side switch within the switching period.

6. The flyback power converter of claim 5, wherein the comparison circuit is configured to operably determine the starting time point according to the secondary side current emulation signal, the peak of the primary side current and the current threshold, and wherein the comparison circuit is configured to operably determine the ending time point according to the secondary side current emulation signal and the peak of the primary side current.

7. The flyback power converter of claim 6, wherein the control signal generation circuit further includes:
    a sample and hold circuit coupled to the comparison circuit, wherein the sample and hold circuit is configured to operably sample and hold the peak of the primary side current, so as to generate an ending threshold which is inputted to the comparison circuit; and
    a bias voltage circuit coupled to the sample and hold circuit, wherein the bias voltage circuit is configured to operably add the ending threshold on a bias voltage value related to the current threshold, so as to generate a starting threshold;
    wherein the comparison circuit compares the secondary side current emulation signal with the starting threshold, so as to determine the starting time point;
    wherein the comparison circuit compares the secondary side current emulation signal with the ending threshold, so as to determine the ending time point.

8. The flyback power converter of claim 5, wherein the secondary side current emulation circuit includes:
    a voltage-to-current conversion circuit, which is configured to operably generate a charging current, wherein the voltage-to-current conversion circuit includes:
        a conversion resistor;

an amplifier circuit coupled to the conversion resistor, wherein the amplifier circuit is configured to operably generate a conversion current flowing through the conversion resistor according to the voltage across the primary winding and a resistance of the conversion resistor, wherein the conversion current is positively proportional to the voltage across the primary winding; and a current mirror circuit coupled to the amplifier circuit, wherein the current mirror circuit is configured to operably mirror the conversion current to generate the charging current; and an emulation capacitor coupled to the current mirror circuit, wherein the emulation capacitor is configured to be operably charged by the charging current, so as to generate the secondary side current emulation signal.

9. The flyback power converter of claim 8, wherein the secondary side current emulation circuit is configured to adaptively adjust the resistance of the conversion resistor and/or a capacitance of the emulation capacitor further according to the voltage across the primary winding during a setting period which follows right after the soft switching period, thereby causing the primary side switch to achieve zero voltage switching;

wherein the setting period is correlated with a period for the voltage across the primary side switch to drop from a charging voltage at the ending time point to zero.

10. An active clamp snubber for use in a flyback power converter, wherein the flyback power converter is configured to operably generate a switching signal for controlling a primary side switch, so as to operate a primary winding in the flyback power converter, thereby converting an input voltage to an output voltage; the active clamp snubber comprising:

a snubber switch, which is connected in series to a snubber capacitor, wherein a series circuit formed by the snubber switch and the snubber capacitor is connected in parallel to the primary winding; and a control signal generation circuit, which is configured to operably control the snubber switch to be conductive during a soft switching period in an OFF period of the primary side switch within a switching period of the switching signal, such that the primary side switch achieves soft switching;

wherein a secondary side control circuit of the flyback power converter is configured to operably control a synchronous rectifier (SR) switch connected in series to a secondary winding of the power transformer according to a secondary side current flowing through the secondary winding of the power transformer, wherein the secondary side control circuit is configured to operably turn OFF the SR switch when the secondary side current is lower than a current threshold;

wherein a starting time point of the soft switching period is determined according to the current threshold, so that the secondary side current is not lower than the current threshold at the starting time point, whereby the secondary side control circuit keeps the SR switch conductive at the starting time point;

wherein the snubber capacitor is configured to be operably charged via a leakage inductor current of the primary winding during a snubber period in the OFF period of the primary side switch within the switching period of the switching signal, the snubber period being different from the soft switching period, such that electrical energy stored in a leakage inductor of the primary winding during an ON period of the primary side switch is delivered to the snubber capacitor.

11. The active clamp snubber of claim 10, wherein the flyback power converter operates in a boundary conduction mode (BCM) or a discontinuous conduction mode (DCM).

12. The active clamp snubber of claim 10, wherein the control signal generation circuit is configured to adaptively adjust an ending time point of the soft switching period according to a voltage across the primary side switch.

13. The active clamp snubber of claim 10, wherein the secondary side current is not lower than the current threshold during the soft switching period, and wherein the secondary side control circuit keeps the SR switch conductive during the soft switching period.

14. The active clamp snubber of claim 10, wherein the control signal generation circuit includes:

a secondary side current emulation circuit, which is configured to operably generate a secondary side current emulation signal according to the voltage across the primary winding and an excited magnetic inductance of the primary winding, so as to emulate the secondary side current; and a comparison circuit coupled to the secondary side current emulation circuit, wherein the comparison circuit is configured to operably generate a soft switching period determination signal according to the secondary side current emulation signal, a peak of a primary side current and the current threshold, so as to determine the starting time point and an ending time point of the soft switching period;

wherein the primary side current is a current which flows through the primary winding during an ON period of the primary side switch within the switching period.

15. The active clamp snubber of claim 14, wherein the comparison circuit is configured to operably determine the starting time point according to the secondary side current emulation signal, the peak of the primary side current and the current threshold, and wherein the comparison circuit is configured to operably determine the ending time point according to the secondary side current emulation signal and the peak of the primary side current.

16. The active clamp snubber of claim 15, wherein the control signal generation circuit further includes:

a sample and hold circuit coupled to the comparison circuit, wherein the sample and hold circuit is configured to operably sample and hold the peak of the primary side current, so as to generate an ending threshold which is inputted to the comparison circuit; and a bias voltage circuit coupled to the sample and hold circuit, wherein the bias voltage circuit is configured to operably add the ending threshold on a bias voltage value related to the current threshold, so as to generate a starting threshold;

wherein the comparison circuit compares the secondary side current emulation signal with the starting threshold, so as to determine the starting time point;

wherein the comparison circuit compares the secondary side current emulation signal with the ending threshold, so as to determine the ending time point.

17. The active clamp snubber of claim 14, wherein the secondary side current emulation circuit includes:

a voltage-to-current conversion circuit, which is configured to operably generate a charging current, wherein the voltage-to-current conversion circuit has:

a conversion resistor;

an amplifier circuit coupled to the conversion resistor, wherein the amplifier circuit is configured to operably generate a conversion current flowing through the conversion resistor according to the voltage across the primary winding and a resistance of the conversion resistor, wherein the conversion current is positively proportional to the voltage across the primary winding; and a current mirror circuit coupled to the amplifier circuit, wherein the current mirror circuit is configured to operably mirror the conversion current to generate the charging current; and an emulation capacitor coupled to the current mirror circuit, wherein the emulation capacitor is configured to be operably charged by the charging current, so as to generate the secondary side current emulation signal.

18. The active clamp snubber of claim 17, wherein the secondary side current emulation circuit is configured to adaptively adjust the resistance of the conversion resistor and/or a capacitance of the emulation capacitor further according to the voltage across the primary winding during a setting period which follows right after the soft switching period, thereby causing the primary side switch to achieve zero voltage switching;

wherein the setting period is correlated with a period for the voltage across the primary side switch to drop from a charging voltage at the ending time point to zero.

* * * * *